United States Patent
McGary et al.

(10) Patent No.: US 7,840,726 B2
(45) Date of Patent: Nov. 23, 2010

(54) SYSTEM AND METHOD FOR IDENTIFYING AND TRANSFERRING SERIAL DATA TO A PROGRAMMABLE LOGIC DEVICE

(75) Inventors: Jon M. McGary, Round Rock, TX (US); Brian L. Brelsford, Austin, TX (US); Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 11/403,035

(22) Filed: Apr. 12, 2006

(65) Prior Publication Data
US 2007/0245049 A1  Oct. 18, 2007

(51) Int. Cl.
G06F 5/00 (2006.01)

(52) U.S. Cl. .............................. 710/65; 710/35; 341/85

(58) Field of Classification Search .................. 710/72, 710/106; 717/109, 120; 702/127; 455/556.1; 712/15, 37; 726/4
See application file for complete search history.

(56) References Cited

U.S. PATENT DOCUMENTS

| | | | |
|---|---|---|---|
| 4,409,587 A * | 10/1983 | Scott | 341/97 |
| 5,233,348 A * | 8/1993 | Pollmann et al. | 341/67 |
| 5,572,208 A * | 11/1996 | Wu | 341/67 |
| 5,892,961 A | 4/1999 | Trimberger | |
| 5,898,893 A * | 4/1999 | Alfke | 710/57 |
| 6,370,603 B1 * | 4/2002 | Silverman et al. | 710/72 |
| 6,425,107 B1 * | 7/2002 | Caldara et al. | 714/759 |
| 6,493,862 B1 | 12/2002 | Young et al. | |
| 6,621,648 B2 * | 9/2003 | Elliott et al. | 360/45 |
| 6,823,283 B2 * | 11/2004 | Steger et al. | 702/127 |
| 6,915,502 B2 * | 7/2005 | Schott et al. | 716/16 |
| 6,934,668 B2 * | 8/2005 | Kodosky et al. | 703/2 |
| 7,114,055 B1 * | 9/2006 | Baxter | 712/37 |

(Continued)

FOREIGN PATENT DOCUMENTS

WO    WO 3010940 A2 *  2/2003

OTHER PUBLICATIONS

Altera, Architectural Differences Between Stratix II and Stratix Devices, Jan. 2006, pp. 1-10.*
Kim et al., A Reconfigurable Multi-function Computing Cache Architecture, 2000, ACM, pp. 85-94.*
Xilinx, OPB General Purpose Input/Output GPIO, Sep. 2003, pp. 1-9.*
Brown et al., Fundamentals of Digital Logic with VHDL Design, 2005, McGraw Hill, pp. 399-401.*

*Primary Examiner*—Cheng-Yuan Tseng
(74) *Attorney, Agent, or Firm*—Baker Botts L.L.P.

(57) ABSTRACT

A system and method is disclosed for programming a field programmable gate array. The system involves the recognition of the next following bit sequence to be transmitted to the FPGA through a general purpose input output device. Once the bit sequence is identified, the data line is only changed at the GPIO in those instances in which the next succeeding data bit in the bit sequences is different from the preceding data bit. In those situations in which the next following bit sequence is not different, the clock line is triggered without the necessity of testing, and changing the logic level of the data line.

9 Claims, 3 Drawing Sheets

U.S. PATENT DOCUMENTS

| | | | |
|---|---|---|---|
| 7,263,277 B2* | 8/2007 | Kim | 386/95 |
| 7,290,244 B2* | 10/2007 | Peck et al. | 717/109 |
| 7,406,134 B1* | 7/2008 | Esposito | 375/308 |
| 2003/0229738 A1* | 12/2003 | Zhuge et al. | 710/100 |
| 2004/0019765 A1* | 1/2004 | Klein, Jr. | 712/15 |
| 2004/0098701 A1* | 5/2004 | Klein | 716/18 |
| 2004/0192380 A1* | 9/2004 | Chen | 455/556.1 |
| 2005/0114700 A1* | 5/2005 | Barrie et al. | 713/201 |
| 2006/0200802 A1* | 9/2006 | Mott et al. | 717/120 |
| 2007/0245049 A1* | 10/2007 | McGary et al. | 710/106 |

\* cited by examiner

SYSTEM AND METHOD FOR IDENTIFYING AND TRANSFERRING SERIAL DATA TO A PROGRAMMABLE LOGIC DEVICE

TECHNICAL FIELD

The present disclosure relates generally to computer systems and information handling systems, and, more particularly, to a system and method for the transfer of serial data to a field programmable gate array.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system may include a field programmable gate array (FPGA). A field programmable gate array is an integrated circuit that includes logic or gates, the function of which can be programmed by the user. Because an FPGA may be programmed upon the power up of the computer system, it is desirable to be able to quickly program the FPGA. One method of programming a FPGA involves the generation of a serial data stream that is transmitted to the FPGA. One method of generating the serial data stream involves the toggling of a general purpose input output device (GPIO) that is coupled to the FPGA. In operation, the CPU of the computer system will write transmit a data signal (logical high or logical low) to the GPIO before each clock cycle of the GPIO. As part of its clock cycle, the GPIO will transmit the data to the FPGA. This process is time consuming, however, as it requires that the CPU to individually test each bit of the data stream, set to the GPIO to the required logic level, then issue a clock cycle of the GPIO, thereby increasing the time required to transmit programming data to the FPGA.

SUMMARY

In accordance with the present disclosure, a system and method is disclosed for programming a field programmable gate array. The system involves the recognition of the next following bit sequence to be transmitted to the FPGA through a general purpose input output device. Once the bit sequence is identified, the logic level of the data line is only changed at the GPIO in those instances in which the next succeeding data bit in the bit sequences is different from the preceding data bit. In those situations in which the next following bit sequence is not different, the clock line is triggered without the necessity of changing the logic level of the data line.

The system and method disclosed herein is technically advantageous because it results in a considerable time saving in the programming of an FPGA. Rather than changing the logical level of the data line as part of each clock cycle, the data line is only changed in those situations in which the next following data bit changes its value from the previous state. The initiation of a clock cycle at in the GPIO causes the content of the data line to be transferred to the FPGA. If the next following data bit to be transferred to the FPGA is not changed from the previous data bit, the data line need not be changed and the initiation of the clock cycle will cause the existing data bit to be transferred to the FPGA. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
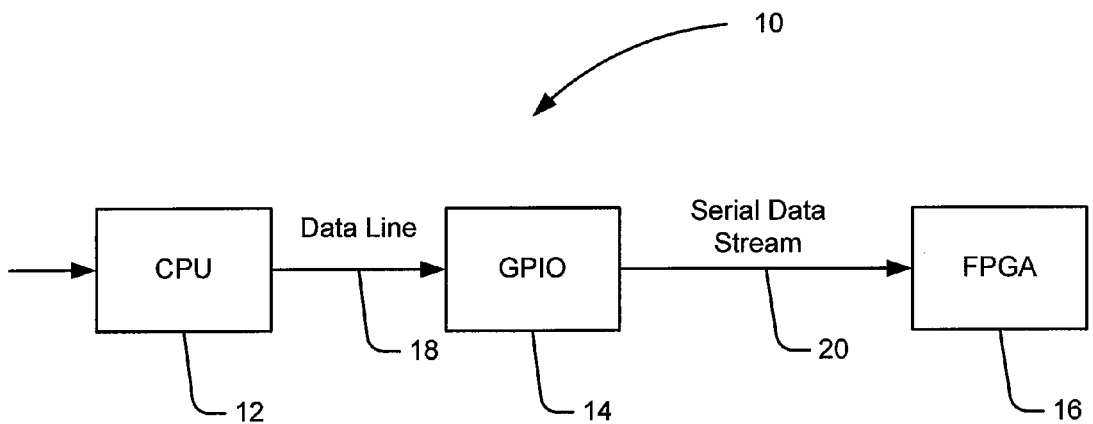
FIG. 1 is a diagram of a computer system.

Shown in FIG. 1 is a diagram of a computer system, which is indicated generally at 10. Computer system 10 includes a processor 12, a general purpose input output device (GPIO) 14, and a field programmable gate array (FPGA) 16. Coupled between processor 12 and GPIO 14 is a data line 18, and coupled between GPIO 14 and FPGA 16 is a serial data stream and clock line 20. In operation, the logic level of data line between the processor and the GPIO is changed by the processor only in those instances in which the data output setting in the GPIO transitions from a logical high to a logical low, or transitions from a logical low to a logical high. The data line will be driven by the processors when the data output setting in the GPIO transitions from a logical low to a logical high, or from a logical high from a logical low. Thus, when the next data bit is the same as the previous data bit, the data line is not driven and the clock signal can be immediately issued to cause the data signal to be transmitted to the FPGA.

Figure 2:
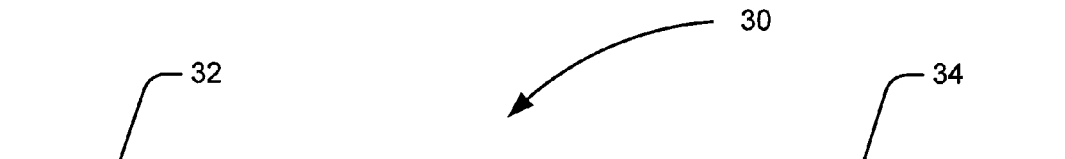
FIG. 2 is a diagram of a GPIO transfer table.

Processor 12 identifies each successive four-bit nibble that will be generated by the GPIO for transfer to the FPGA. The processor reads ahead from the bit stream one nibble at a time. The bit stream may be contained in memory or storage of the computer system. Each of the sixteen possible nibble combinations (0×0-0×f) is an index into a function pointer array. A function pointer array is shown in column 32 of a data transfer function, which is shown in table 30 of FIG. 2. Each of the sixteen possible nibble functions, which are shown in column 34 of table 30, is able to clock the four data bits associated with the nibble combination. Because the associated of a function and a respective data sequence is predetermined, no comparison of the data bits is necessary by the processor.

As an example, the data transfer function for the nibble 0000 is set low, clock, clock, clock, clock. This data transfer functions means that the processor will drive the data output setting of the GPIO to a logical low, and this setting will be output by the GPIO over the course of the GPIO's next four clock cycles. Thus, because the data output setting of the GPIO is not transitioning between states, the data output setting need only be set once and output to the FPGA on each clock cycle of the GPIO. Thus, the processor was not required to test any data bits to determine the setting of the GPIO data line, and no unnecessary bit transitions were implemented. As another example, the data transfer function for the nibble 1010 is set high, clock, set low, clock, set high, clock, set low, clock. In this example, the data output setting is transitioning between a logical low and a logical high. The processor first drives the data output setting to a logical high, and this setting is output to the FPGA on the next clock cycle of the GPIO. Because the next clock setting is a logical low, the processor must next drive the data output setting of the GPIO to a logical low, which will be output to the FPGA on the next clock cycle of the GPIO. The next clock setting is a logical high, which requires a transition from a logical low to a logical high at the data output setting of the GPIO. To accomplish this transition, the processor drives the data output setting of the GPIO to a logical high, which is output to the FPGA on the next clock cycle of the GPIO. Finally, because the next clock setting is a logical low, the processor must next drive the data output setting of the GPIO to a logical low, which will be output to the FPGA on the next clock cycle of the GPIO. Because the data output setting of the GPIO is continually transitioning between logical states, the processors drives the GPIO to the new state before each clock cycle of the GPIO, and data output of the GPIO is transmitted to the FPGA on the next clock cycle of the GPIO.

Figure 3:
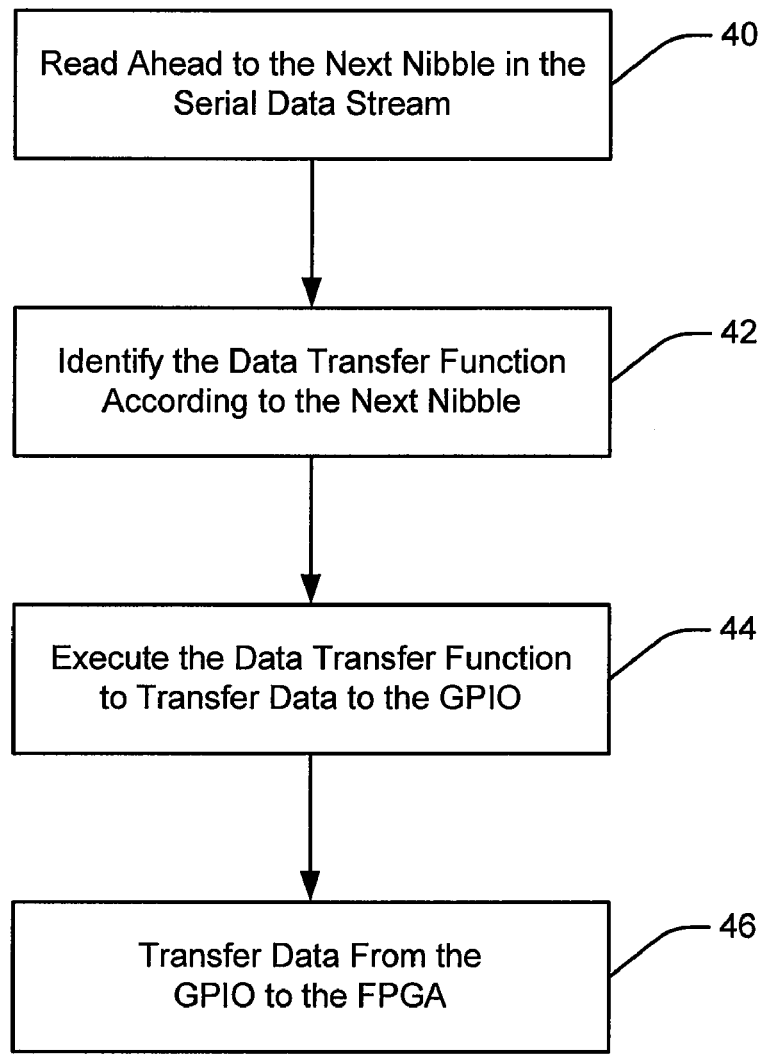
FIG. 3 is a flow diagram of a method for transmitting data from the GPIO to the FPGA.

Shown in FIG. 3 is a flow diagram of a series of method steps for transmitting data from the GPIO to the FPGA under the control of the processor of the computer system. At step 40, the processor of the computer system executes a read-ahead function to determine the next four successive bits that will be transferred from the GPIO to the FPGA. At step 42, the processor examines table 30 to find the data transfer function associated with the nibble. The processor executes the located data transfer function at step 44. As described, as part of the data transfer function, the processor drives the data output setting of the GPIO only in those instances in which the data output setting transitions from one logical setting to another logical setting. At all other times, the data output setting is not modified and the existing data output setting of the GPIO is output to the FPGA on the next clock cycle of the GPIO. At step 46, the execution of the transfer data function at the processor and GPIO results in the transfer of serial data from the GPIO to the FPGA.

The system and method disclosed herein is advantageous because it avoids the necessity of decoding and manually clocking in data to an FPGA or other device. The system and method disclosed herein involves a technique for predetermining the possible data sequences and using those sequences as the indices of a lookup table. The lookup table includes a set of optimized instructions for each possible data sequence. The data sequence itself need not be limited to a data sequence that is one nibble in length. Although the index function has been described with respect to nibbles of four bits, it should be understood that longer bit sequences could be used as part of the indexing and data clocking scheme disclosed herein. For example, it would be possible to implement the disclosed system and method with an index that is one byte long, which would yield 256 data transfer functions.

The system and method disclosed herein reduces the time required to load a programmable device, such as an FPGA. The system and method disclosed herein is not limited in its application to the transfer of data to FPGAs. Rather, the system and method disclosed herein could be used for any serial data transfers. Although the present disclosure has been described in detail, it should be understood that various changes, substitutions, and alterations can be made hereto without departing from the spirit and the scope of the invention as defined by the appended claims.

What is claimed is:

1. A method for transmitting data to a field programmable gate array, comprising:

determining a plurality of data transfer functions, wherein each data transfer function corresponds to a set of data bits from a plurality of sets of data bits, wherein each set has a pre-determined length of data bits, and wherein the step of determining is performed for each unique set of data bits;

identifying a set of data bits to be transmitted to the field programmable gate array, wherein the set of data bits is read ahead from the plurality of sets of data bits one set of data bits at a time, wherein the step of identifying a set of data bits to be transmitted is performed by a processor that is coupled to a general purpose input output device;

identifying the data transfer function corresponding to the identified set of data bits, wherein the identification is made, at least in part, by using a logical value of the identified set of data bits as an index of a lookup table to identify in the lookup table a location containing the data transfer function corresponding to the identified set of data bits, wherein the lookup table includes a location for each of the plurality of data transfer functions, wherein each data transfer function includes optimized instructions for driving a data line and a clock line of a general purpose input output device, and wherein the optimized instructions of the data transfer function corresponding to the identified set of data bits involve driving the data line only if an associated data bit in the identified set of data bits transitions from (a) a logical high to a logical low, or (b) from a logical low to a logical high; and executing the data transfer function at the general purpose input output device to transfer data to the field programmable gate array.

2. The method for transmitting data to field programmable gate array of claim 1, wherein the identified set of data bits is four bits in length.

3. The method for transmitting data to field programmable gate array of claim 1, wherein the identified set of data bits is one byte in length.

4. A method for transmitting serial data from a first device to a second device, comprising:
- determining a plurality of data transfer functions, wherein each data transfer function corresponds to a set of data bits from a plurality of sets of data bits, wherein each set has a pre-determined length of data bits, and wherein the step of determining is performed for each unique set of data bits;
- identifying a set of data bits to be transmitted, wherein the set of data bits is read ahead from the plurality of sets of data bits one set of data bits at a time, wherein the step of identifying a set of data bits to be transmitted is performed by a processor that is coupled to a general purpose input output device;
- identifying the data transfer function corresponding to the identified set of data bits, wherein the identification is made, at least in part, by using a logical value of the identified set of data bits as an index of a lookup table to identify in the lookup table a location containing the data transfer function corresponding to the identified set of data bits, wherein the lookup table includes a location for each of the plurality of data transfer functions, wherein each data transfer function includes optimized instructions for driving a data line and a clock line of the general purpose input output device, and wherein the optimized instructions of the data transfer function corresponding to the identified set of data bits involve driving the data line only if an associated data bit in the identified set of data bits transitions from (a) a logical high to a logical low, or (b) from a logical low to a logical high; and
- executing the data transfer function at the first device to transfer data to the second device, wherein the first device is a general purpose input output device and the second device is a programmable gate array.

5. The method for transmitting serial data from a first device to a second device of claim 4, wherein the identified set of data bits is four bits in length.

6. The method for transmitting serial data from a first device to a second device of claim 4, wherein the identified set of data bits is one byte in length.

7. An information handling system, comprising:
a processor;
a general purpose input output device having an output and an input coupled to the processor;
a field programmable gate array, wherein an input of the FPGA is coupled to the output of the general purpose input output device;
wherein the processor is programmed to:
determine a plurality of data transfer functions, wherein each data transfer function corresponds to a set of data bits from a plurality of sets of data bits, wherein each set has a pre-determined length of data bits, and wherein the step of determining is performed for each unique set of data bits; and
identify a set of data bits to be transmitted to the field programmable gate array, wherein the processor reads ahead from a bit stream one set of data bits at a time;
wherein, for the set of data bits identified by the processor, identifying at the processor the data transfer function corresponding to the identified set of data bits, wherein the identification is made, at least in part, by using a logical value of the identified set of data bits as an index of a lookup table to identify in the lookup table a location containing the data transfer function corresponding to the identified set of data bits, wherein the lookup table includes a location for each of the plurality of data transfer functions, wherein each data transfer function includes optimized instructions for driving a data line and a clock line of a general purpose input output device, and wherein the optimized instructions of the data transfer function corresponding to the identified set of data bits involve driving the data line only if an associated data bit in the identified set of data bits transitions from (a) a logical high to a logical low, or (b) from a logical low to a logical high; and
wherein the processor causes the execution of the data transfer function at the general purpose input output device to transfer data to the field programmable gate array.

8. The information handling system of claim 7, wherein the identified set of data bits is four bits in length.

9. The information handling system of claim 7, wherein the identified set of data bits is one byte in length.

* * * * *